United States Patent
Richard et al.

(10) Patent No.: US 10,746,132 B2
(45) Date of Patent: Aug. 18, 2020

(54) SOLENOID-CONTROLLED, LIQUID CRYOGENIC-HYDRAULICALLY ACTUATED ISOLATION VALVE ASSEMBLY

(71) Applicant: United States of America as represented by the Administrator of NASA, Washington, DC (US)

(72) Inventors: James Andrew Richard, Grant, AL (US); Travis Allen Davis, Belle Fourche, SD (US); Brad M. Addona, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 72 days.

(21) Appl. No.: 15/964,655

(22) Filed: Apr. 27, 2018

(65) Prior Publication Data

US 2019/0331060 A1    Oct. 31, 2019

(51) Int. Cl.
  *F16K 31/122*    (2006.01)
  *F02K 9/58*    (2006.01)
  *F16K 24/04*    (2006.01)
  *F17C 13/04*    (2006.01)

(52) U.S. Cl.
  CPC ............... *F02K 9/58* (2013.01); *F16K 24/04* (2013.01); *F17C 13/04* (2013.01); *F16K 31/1225* (2013.01)

(58) Field of Classification Search
  CPC .................................................. F16K 31/1225
  USPC ........................................ 251/30.05, 31, 63
  See application file for complete search history.

(56) References Cited

U.S. PATENT DOCUMENTS

| | | | | |
|---|---|---|---|---|
| 2,605,079 A | * | 7/1952 | Miller | F15B 13/0402 137/625.64 |
| 3,907,248 A | * | 9/1975 | Coulbeck | F16K 31/122 251/30.02 |
| 5,415,378 A | * | 5/1995 | Craven | E21B 34/02 251/31 |

\* cited by examiner

*Primary Examiner* — Robert K Arundale
(74) *Attorney, Agent, or Firm* — James J. McGroary; Helen M. Galus

(57) ABSTRACT

The present invention is directed toward a new and improved solenoid-controlled, liquid cryogenic-hydraulically actuated valve assembly wherein, in addition to the valve assembly controlling the flow of liquid cryogenic fluid therethrough, a portion of the liquid cryogenic fluid is effectively utilized to hydraulically actuate and control OPEN and CLOSED valves to predetermined positions such that the flow of cryogenic fluid, through the valve assembly from an inlet flange to an outlet flange of the valve assembly, is permitted or prevented.

4 Claims, 8 Drawing Sheets

SOLENOID-CONTROLLED, LIQUID CRYOGENIC-HYDRAULICALLY ACTUATED ISOLATION VALVE ASSEMBLY

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

FIELD OF THE INVENTION

The present invention relates generally to valves, and more particularly to a new and improved solenoid-controlled, liquid cryogenic-hydraulically actuated isolation valve assembly wherein, in addition to the valve assembly controlling the flow of liquid cryogenic fluid therethrough, a portion of the liquid cryogenic fluid is effectively diverted so as to hydraulically actuate and control OPEN and CLOSED valves to predetermined positions such that the flow of cryogenic fluid, through the valve assembly from an inlet flange to an outlet flange of the valve assembly, is permitted or prevented.

BACKGROUND OF THE INVENTION

Liquid rocket propulsion systems utilize cryogenic media as propellants. Valves controlling and redirecting such media can be electromechanically controlled, however, such systems also need gearing elements or components and motor controllers that monitor the various positions of the valves. Accordingly, it has been found that such systems can be quite expensive as well as energy intensive. Alternatively, cryogenic media control valves can be pneumatically controlled utilizing helium. Most gases other than helium will liquefy or even freeze at liquid hydrogen temperatures, and therefore, the pneumatic actuation of cryogenic valves is normally performed utilizing helium or other noble gases, or gases with similar properties, which, unfortunately, are in limited supply. Pneumatically controlled cryogenic valves also have additional operational drawbacks, however, in that such valves necessarily require various support systems which include, for example, storage tanks, various fluid lines or conduits, other control valves, isolation valves, and the like. Still further, both electromechanically controlled and pneumatically controlled cryogenic media control valves require a substantial support system in order to ensure that they operate correctly and reliably, however, when such systems are employed within spacecraft environments, reduced energy consumption, and reduced support system weight and footprints, are necessary objectives.

A need therefore exists in the art for a new and improved valve assembly. An additional need in the art exists for a new and improved valve assembly that can be advantageously used, for example, upon rockets and spacecraft, in other applications such as, for example, in connection with the production and control of liquefied natural gas, or still further within other cryogenic environments and systems. A further need exists in the art for a new and improved valve assembly that can be advantageously used, for example, upon rockets and spacecraft where space, to accommodate various necessary operational systems, is at a premium. A still further need exists in the art for a new and improved valve assembly that can be advantageously used, for example, upon rockets and spacecraft where space, to accommodate various necessary operational systems, is at a premium, wherein the valve assembly will not require any substantial auxiliary support components in order to render the valve assembly operational. A yet still further need exists in the art for a new and improved valve assembly that can be advantageously used, for example, upon rockets and spacecraft where space, to accommodate various necessary operational systems, is at a premium, and wherein the valve assembly will be able to use existing components so as not to require the use of any substantial auxiliary support components in order to render the valve assembly operational.

OVERALL OBJECTIVES OF THE INVENTION

An overall objective of the present invention is to provide a new and improved valve assembly. An additional overall objective of the present invention is to provide a new and improved valve assembly that can be advantageously used, for example, upon rockets and spacecraft, in other applications such as, for example, in connection with the production and control of liquefied natural gas, or still further within other cryogenic environments and systems. A further overall objective of the present invention is to provide a new and improved valve assembly that can be advantageously used, for example, upon rockets and spacecraft where space, to accommodate various necessary operational systems, is at a premium. A still further overall objective of the present invention is to provide a new and improved valve assembly that can be advantageously used, for example, upon rockets and spacecraft where space, to accommodate various necessary operational systems, is at a premium, wherein the valve assembly will not require any substantial auxiliary support components in order to render the valve assembly operational. A yet still further overall objective of the present invention is to provide a new and improved valve assembly that can be advantageously used, for example, upon rockets and spacecraft where space, to accommodate various necessary operational systems, is at a premium, and wherein the valve assembly will be able to use existing components so as not to require the use of any substantial auxiliary support components in order to render the valve assembly operational.

SUMMARY OF THE INVENTION

The foregoing and other objectives are achieved in accordance with the teachings and principles of the present invention through the provision of a new and improved solenoid-controlled, liquid cryogenic-hydraulically actuated valve assembly wherein, in addition to controlling or directing the flow of cryogenic fluid to a destination at which the cryogenic fluid is to be utilized, a portion of the cryogenic fluid is effectively diverted and utilized as the actuating fluid for moving the OPEN and CLOSED pistons of the valve assembly to their intended positions such that the cryogenic fluid can alternatively be permitted to flow through the cryogenic valve assembly and be conveyed from at least one inlet flange of the valve assembly to at least one outlet flange of the valve assembly, or to be prevented from flowing through the cryogenic valve assembly from the inlet flange of the valve assembly to the outlet flange of the valve assembly.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 4b is a schematic fluid circuit diagram of the new and improved solenoid-controlled, liquid cryogenic-hydraulically actuated valve assembly, as illustrated within FIGS. 1 and 4a, illustrating the disposition of the various valve assembly components so as to achieve the flow-through of the cryogenic fluid from the inlet flange to the outlet flange of the valve assembly as illustrated within FIG. 4a;

FIG. 5b is a schematic fluid circuit diagram of the new and improved solenoid-controlled, liquid cryogenic-hydraulically actuated valve assembly, as illustrated within FIGS. 1 and 5a, illustrating the disposition of the various valve assembly components so as to prevent the flow-through of the cryogenic fluid from the inlet flange to the outlet flange of the valve assembly as illustrated within FIG. 5a;

FIG. 6b is a schematic fluid circuit diagram of the new and improved solenoid-controlled, liquid cryogenic-hydraulically actuated valve assembly, as illustrated within FIG. 6a, illustrating the disposition of the various valve assembly components so as to achieve the force-balanced, bi-stable disposition of the piston assembly as illustrated within FIG. 6a;

DETAILED DESCRIPTION OF THE PREFERRED EMBODIMENT

Figure 1:
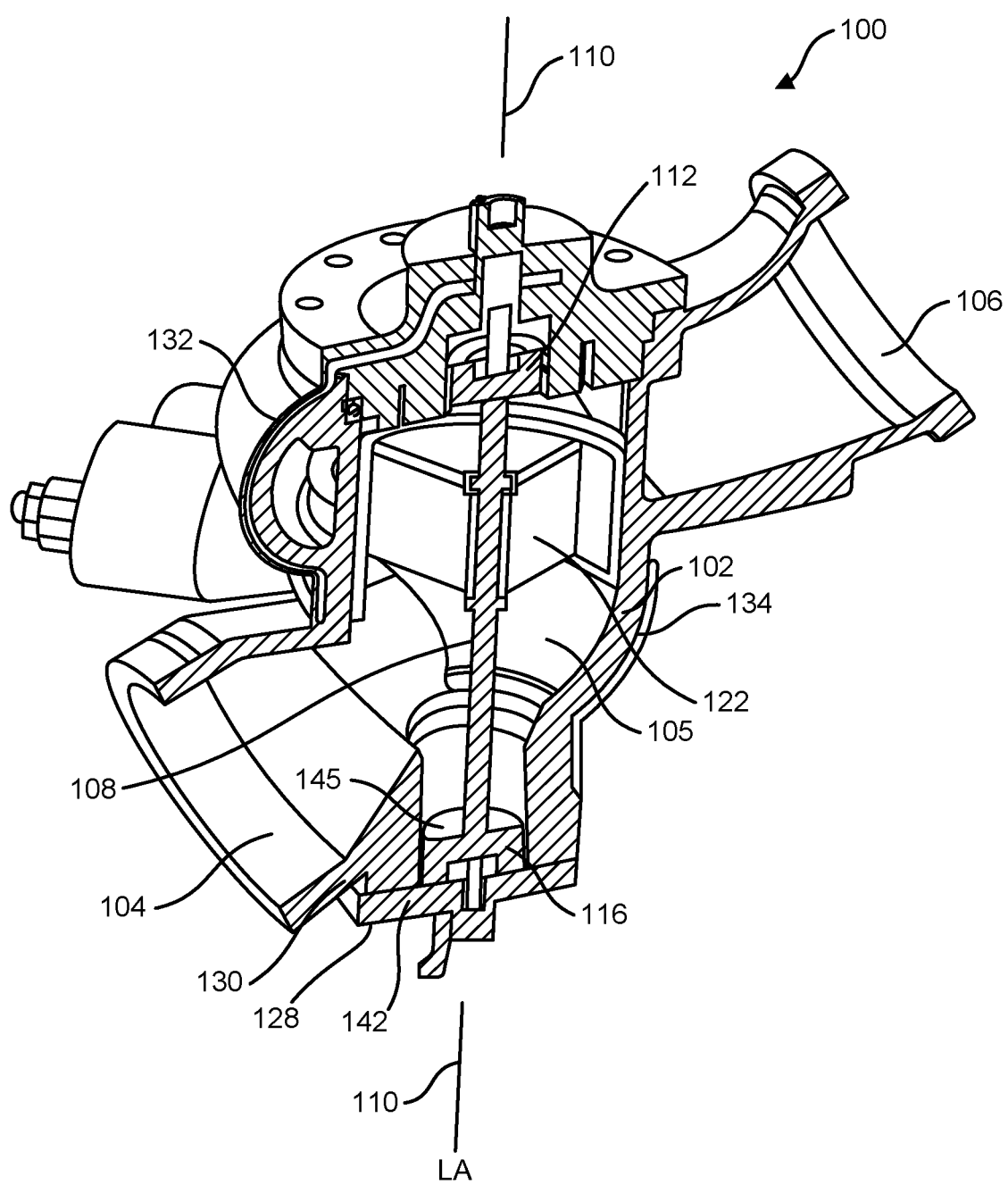
FIG. 1 is a schematic perspective view of the new and improved solenoid-controlled, liquid cryogenic-hydraulically actuated valve assembly as constructed in accordance with the principles and teachings of the present invention.
Figure 2:
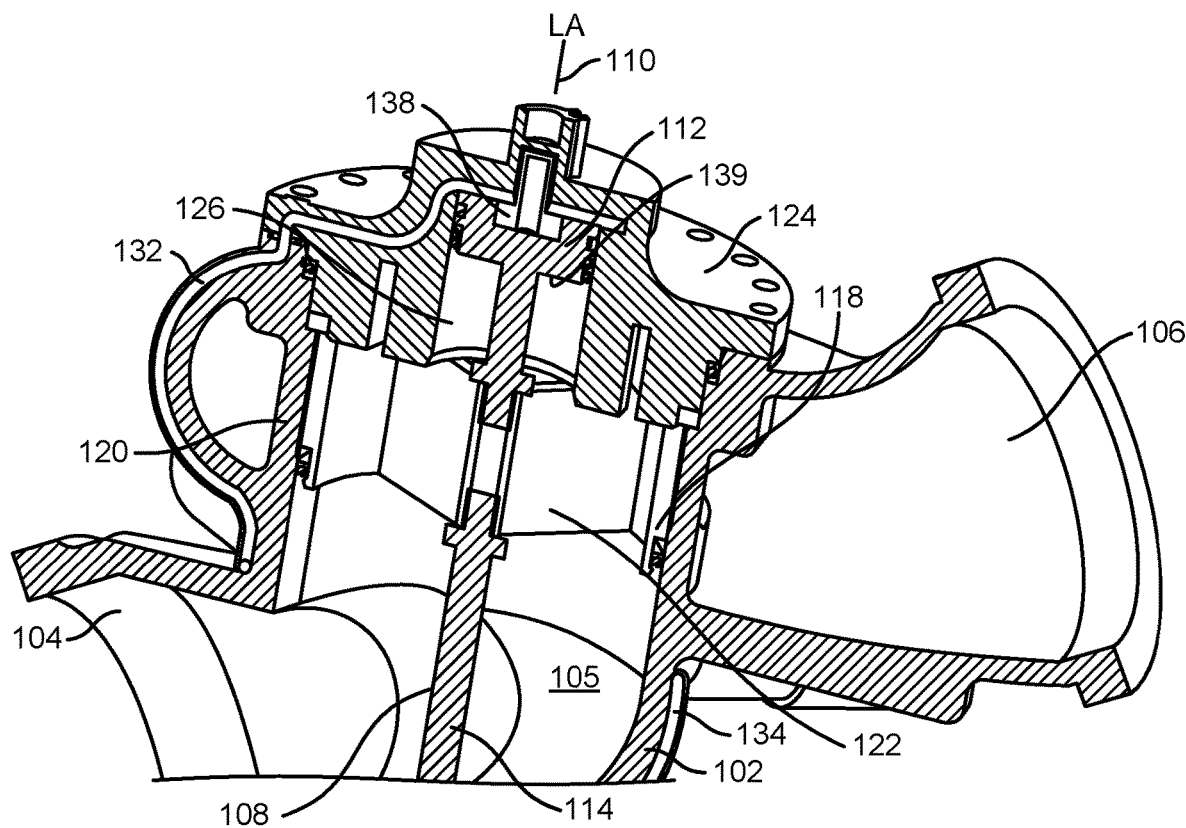
FIG. 2 is an enlarged view of the upper section of the new and improved solenoid-controlled, liquid cryogenic-hydraulically actuated valve assembly, as illustrated within FIG. 1, showing in greater detail the disposition of the piston rod strut sub-assembly and the closed piston when the piston rod strut sub-assembly and the closed piston have been moved to their uppermost positions so as to effectively prevent flow-through of the cryogenic fluid from the inlet flange to the outlet flange.
Figure 3:
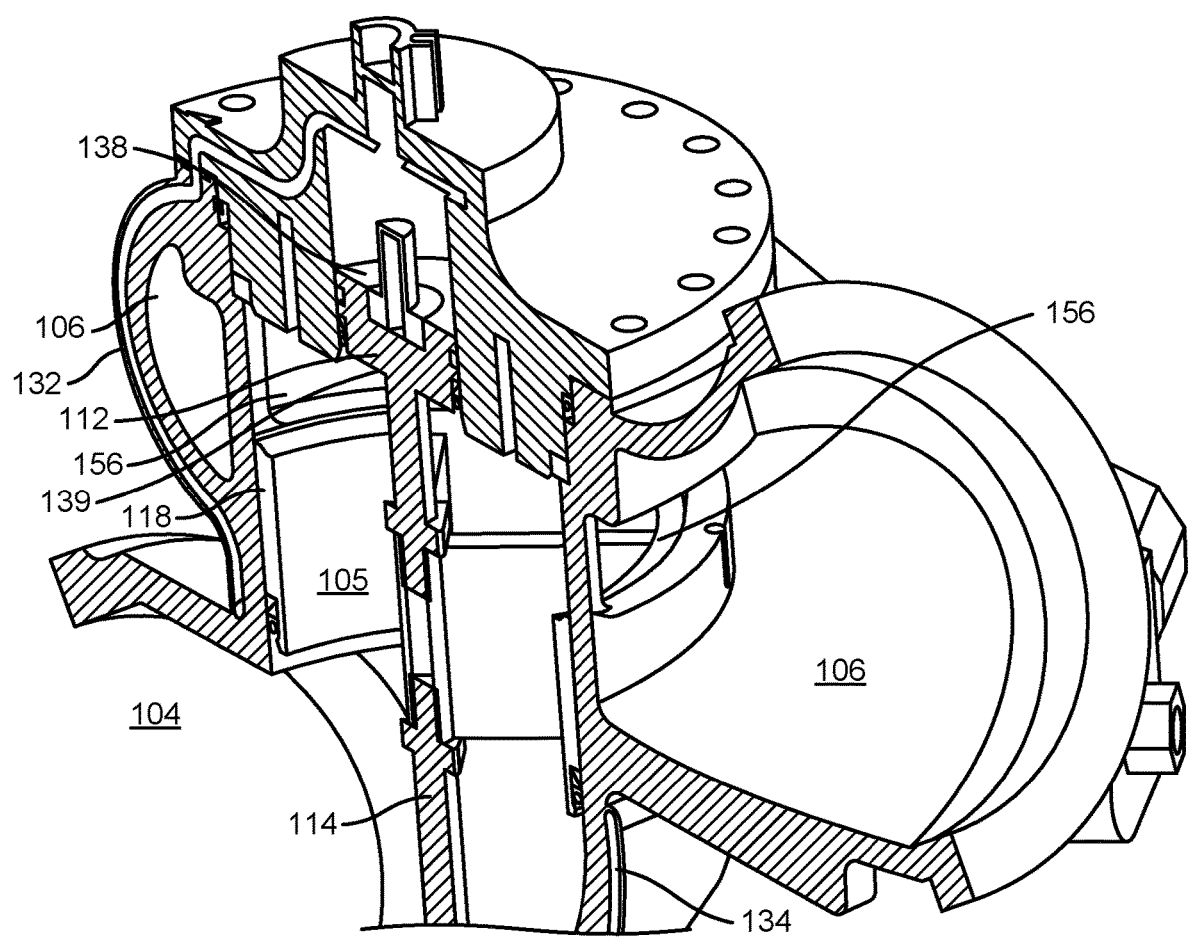
FIG. 3 is an enlarged view of the upper section of the new and improved solenoid-controlled, liquid cryogenic-hydraulically actuated valve assembly, similar to that illustrated within FIGS. 1 and 2, showing, however, in greater detail, the disposition of the piston rod strut sub-assembly and the closed piston when the piston rod strut sub-assembly and the closed piston have not yet been moved to their uppermost positions so as to effectively permit the piston rod strut sub-assembly to uncover window structure defined within peripheral wall portions of the valve assembly so as to permit flow-through of the cryogenic fluid from the inlet flange to the outlet flange.

Referring now to the drawings, and more particularly to FIGS. 1-3 thereof, the new and improved solenoid-controlled, liquid cryogenic-hydraulically actuated valve assembly, as constructed in accordance with the principles and teachings of the present invention, is illustrated and is generally indicated by the reference character 100. More particularly, it is seen that the new and improved solenoid-controlled, liquid cryogenic-hydraulically actuated valve assembly 100 comprises a valve housing 102. A first fluid inlet flange or conduit 104 is integrally attached to a first lower side wall portion of the valve housing 102 and is fluidically connected to the central interior portion 105 of the valve housing 102, while a second outlet flange or conduit 106 is integrally attached, in a surrounding manner, to an upper side wall portion of the valve housing 102 and is likewise fluidically connected to the central interior portion 105 of the valve housing 102. A piston rod assembly 108 is disposed within the central interior portion 105 of the valve housing 102 so as to be reciprocally moved along a vertically extending longitudinal axis (LA) 110 of the valve housing 102, and it is seen that a first CLOSED piston 112 is integrally attached to or formed with an upper end portion of a piston rod 114 of the piston rod assembly 108, while a second OPEN piston 116 is integrally attached to or formed with a lower end portion of the piston rod 114.

Still further, the piston rod assembly 108 also comprises an annular wall member 118 which is adapted to be movable along a vertically oriented wall portion 120 of the valve housing 102, while a plurality of planar, plate-like struts 122 extend radially outwardly from the piston rod 114 so as to fixedly connect the piston rod 114 to the annular wall member 118. In this manner, the entire piston rod assembly 108, comprising the first CLOSED piston 112, the piston rod 114, the second OPEN piston 116, the annular wall member 118, and the plurality of struts 122, comprises a single structural entity, all components of which move together between the uppermost and lowermost positions of the piston rod assembly 108 as will be described more fully hereinafter. In order to effectively complete the valve assembly 108, it is noted that a cylinder head 124 is fixedly secured atop the valve housing 102, and a first piston cylinder 126 is defined within the cylinder head 124 so as to accommodate the vertically reciprocal up and down movements of the first CLOSED piston 112. In a similar manner, as disclosed within FIG. 1, a cylinder base 128 is fixedly secured to the lower end portion of the valve housing 102 while the lower end portion of the valve housing 102 defines a second piston cylinder 130 for accommodating the vertically reciprocal up and down movements of the second OPEN piston 116.

It is lastly noted, as can best be seen from FIGS. 1 and 2, that a first fluid control or actuator conduit 132 is effectively defined within the upper portion of the valve housing 102 as well as within the cylinder head 124, while a second fluid control or actuator conduit 134 is effectively defined within the lower portion of the valve housing 102. A first end of the first fluid control or actuator conduit 132 is fluidically connected to the first fluid inlet flange or conduit 104 by means of a first cryogenic fluid diversion conduit 136, as schematically illustrated within FIGS. 4b, 5b, 6b, while a second opposite end of the first fluid control or actuator conduit 132 is fluidically connected to the interior of the first piston cylinder 126 whereby line pressure can act upon an upper surface portion 138 of the first CLOSED piston 112. Line pressure will move through the first fluid inlet flange or conduit 104, further on through the interior portion 105 of the valve housing 102, inside the annular wall member 118 and its plurality of struts 122, whereby line pressure will also be acting upon the lower or undersurface portion 139 of the first CLOSED piston 112, thereby providing a force-balanced, bi-stable disposition in pressurized cases. In a similar manner, a first end of the second fluid control or actuator conduit 134 is fluidically connected to the first fluid inlet conduit or flange 104 by means of a second cryogenic fluid diversion conduit 140, while a second opposite end of the second fluid control or actuator conduit 134 is fluidically connected to the interior of the second piston cylinder 130 and to a lower surface portion 142 of the second OPEN piston 116 such that line fluid can act upon the lower or undersurface portion 142 of the second OPEN piston 116. Due to the adjacent location and fluidic connection of the first fluid inlet conduit or flange 104 and the interior of the second piston cylinder 130, line pressure will always be acting upon the upper face 145 of the second OPEN piston 116 thereby likewise providing a force-balanced, bi-stable disposition in initial pressurization cases. It is additionally seen that a first interconnecting fluid conduit 141 serves to fluidically interconnect the first fluid control or actuator conduit 132 with the first cryogenic fluid diversion conduit 136, while a second interconnecting fluid conduit 143 serves to fluidically interconnect the second fluid control or actuator conduit 134 with the second cryogenic fluid diversion conduit 140.

Figure 7:
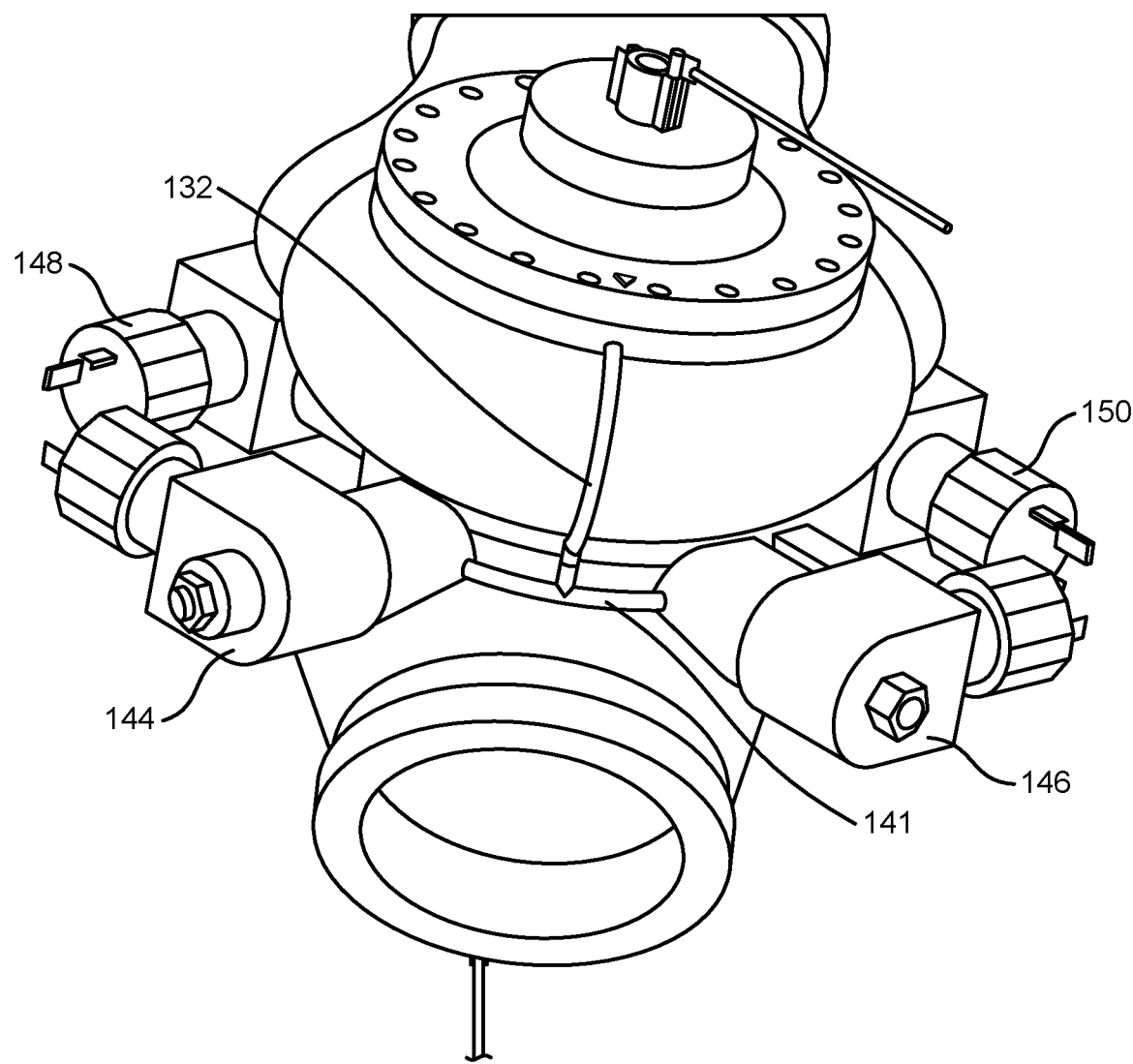
FIG. 7 is a schematic side perspective view of the new and improved solenoid-controlled, liquid cryogenic-hydraulically actuated valve assembly of the present invention, effectively illustrating the valve assembly in a three-dimensional view so as to illustrate how the four two-position solenoid control valves are disposed relative to the main valve assembly.
Figure 8:
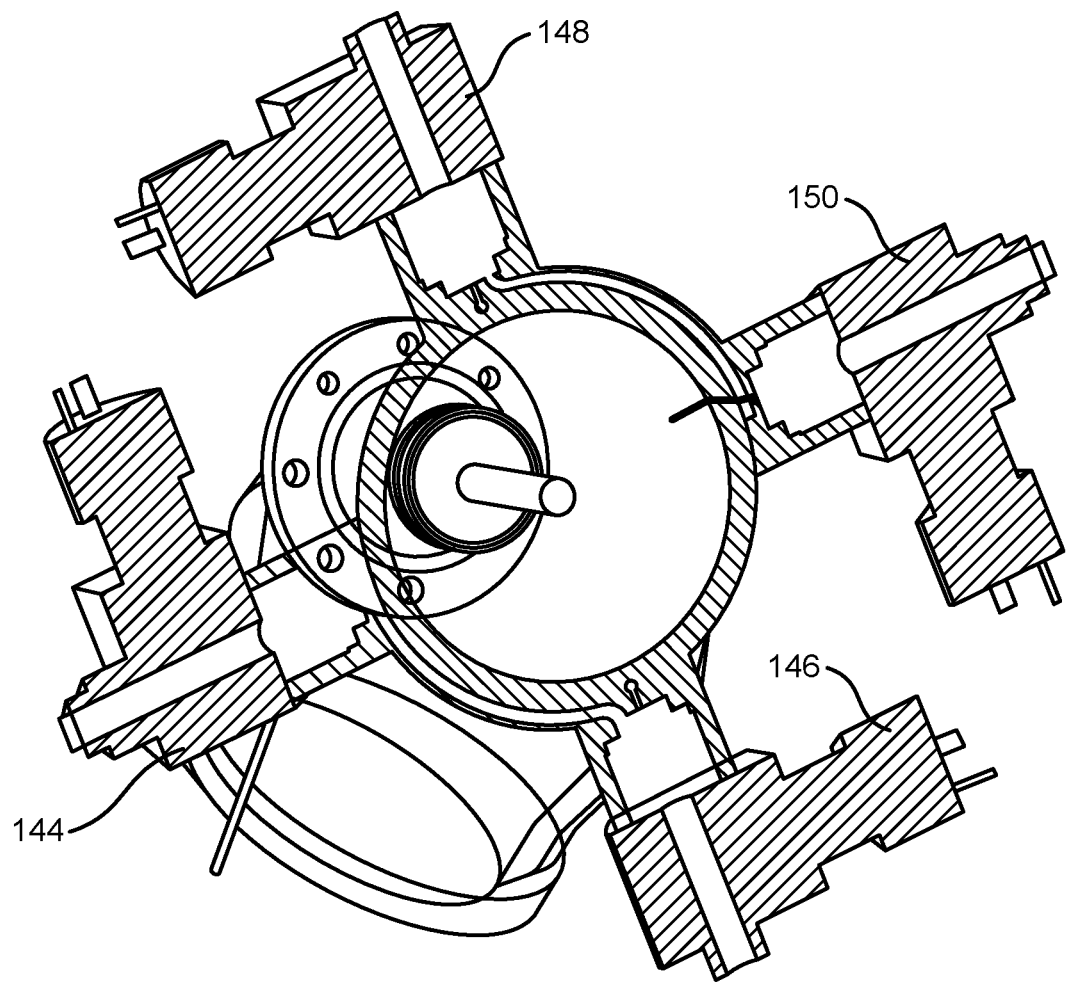
FIG. 8 is a schematic top perspective cross-sectional view of the new and improved solenoid-controlled, liquid cryogenic-hydraulically actuated valve assembly of the present invention, effectively illustrating the fluid flow lines from the plurality of two-position solenoid control valves to the main valve assembly.

Having described substantially all of the structural components of the new and improved solenoid-controlled, liquid cryogenic-hydraulically actuated valve assembly 100, a brief description of several additional structural components of the valve assembly 100, necessary to the operation of the valve assembly 100 in order for the valve assembly 100 to achieve any one of its various positions or states, will now be described along with the operations of the valve assembly 100. More particularly, as can be appreciated from FIGS. 4b, 5b, 6b, 7, and 8, four, two-position solenoid-controlled valves 144,146,148,150 are operatively associated with the valve assembly 100, wherein valves 144,146 are operatively associated with the first fluid inlet flange or conduit 104, the first CLOSED piston 112, and the second fluid outlet flange or conduit 106, while valves 148,150 are operatively associated with the first fluid inlet flange or conduit 104, the second OPEN piston 116, and the second fluid outlet flange or conduit 106. It is to be noted, as can best be appreciated from FIGS. 7 and 8, that the four two-position solenoid-controlled valves 144,146,148,150 are disposed within an equiangularly spaced circumferential array around the valve assembly 100. More particularly, it is seen that a first vent conduit 152 is adapted to be fluidically connected, at one end thereof, to an extension of the first interconnecting fluid conduit 141 through means of the solenoid-controlled valve 146, while a second opposite end of the first vent conduit 152 is fluidically connected to the second fluid outlet flange or conduit 106. In a similar manner, a second vent conduit 154 is adapted to be fluidically connected, at one end thereof, to an extension of the second interconnecting fluid conduit 143 through means of the solenoid-controlled valve 150, while a second opposite end of the second vent conduit 154 is fluidically connected to the second fluid outlet flange or conduit 106.

Figure 4A:
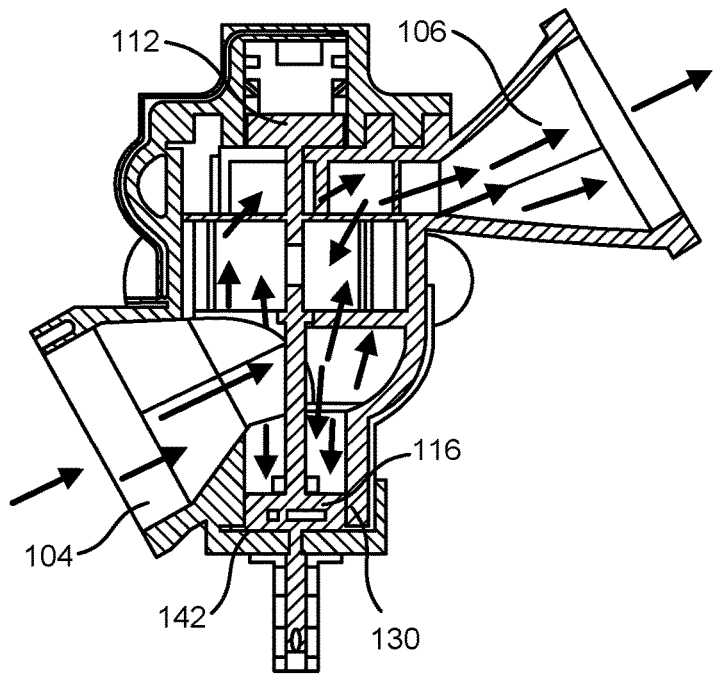
FIG. 4a is a schematic view of the new and improved solenoid-controlled, liquid cryogenic-hydraulically actuated valve assembly as illustrated within FIG. 1 showing the flow-through of the cryogenic fluid from the inlet flange to the outlet flange of the valve assembly.
Figure 4B:
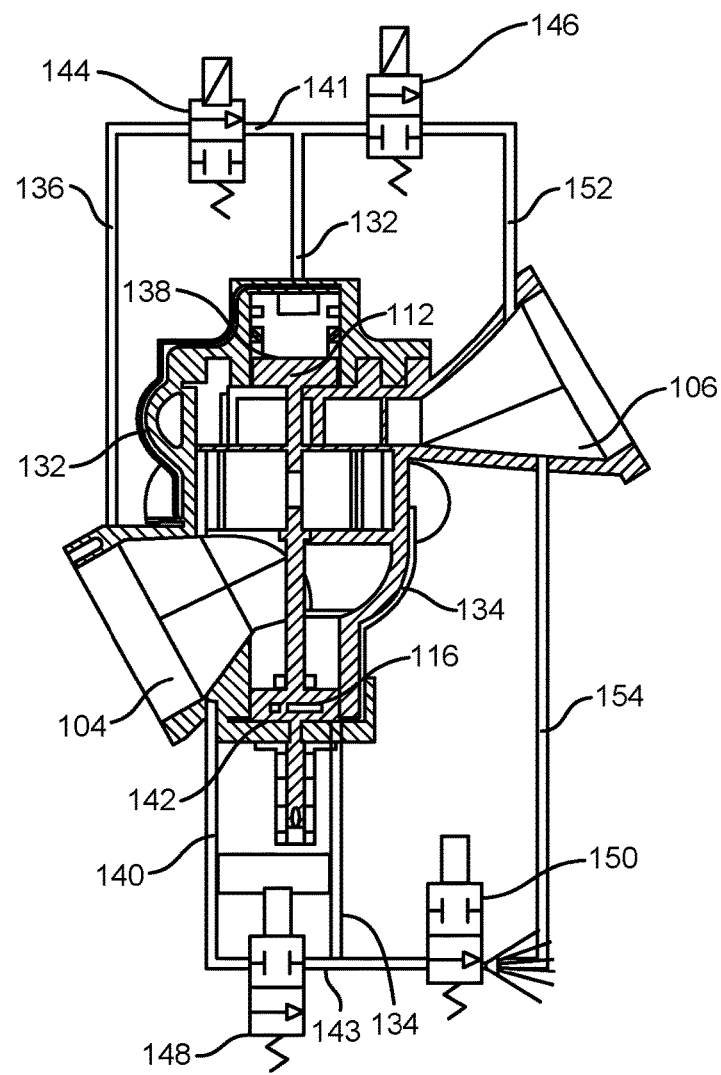

Accordingly, when the first two-position solenoid-controlled normally open valve 144 is in its uncharged, and therefore, OPEN, first position, cryogenic fluid is permitted to flow from the first cryogenic fluid diversion conduit 136, pass through valve 144, flow into the first interconnecting fluid conduit 141, and then flow into the first fluid control or actuator conduit 132, while at the same time, the second two-position solenoid-controlled normally closed valve 146 is disposed at its first position so as to prevent the flow of the cryogenic fluid to pass therethrough and into the first vent conduit 152, all as illustrated within FIG. 4b. As a result of these valve movements, the cryogenic fluid will be forced to flow into the first cryogenic fluid actuator conduit 132 such that the cryogenic fluid will act upon and balance the first CLOSED piston 112. Concomitantly with the aforenoted disposition of the first and second solenoid-controlled valves 144,146 at the aforenoted positions, the third and fourth solenoid-controlled valves 148,150 are actuated such that the third solenoid-controlled normally open valve 148 is disposed at its charged position that effectively blocks fluid flow through the second cryogenic fluid diversion conduit 140, however the fourth solenoid-controlled normally closed valve 150 has been moved to its first position at which fluid flow is permitted to occur from beneath the undersurface portion 142 of the OPEN piston 116, through the second fluid control or actuator conduit 134, and out through the second vent conduit 154 so as to effectively be entrained within the cryogenic fluid flow flowing through the valve assembly 100 and being conducted out from the outlet flange or conduit 106. The aforementioned line pressure, being transferred through the first fluid inlet conduit or flange 104 and the interior of the second piston cylinder 130, will be acting upon the upper face 145 of the second OPEN piston 116 thereby providing a downward force that will move the piston rod assembly 108 and its accompanying annular wall member 118 of the piston rod assembly 108, downward as well. As can best be seen in FIG. 3, the upper portion of the valve housing 102 is provided with a plurality of windows 156, and as can also be best appreciated from FIG. 3, when the piston rod assembly 108 has been moved downwardly, the annular wall member 118 of the piston rod assembly 108 effectively uncovers the plurality of windows 156 such that the cryogenic fluid can in fact be permitted to flow from the first fluid inlet flange or conduit 104, into the interior region 105 of the valve housing 102, through the windows 156, and out through the second fluid outlet flange or conduit 106.

Figure 5A:
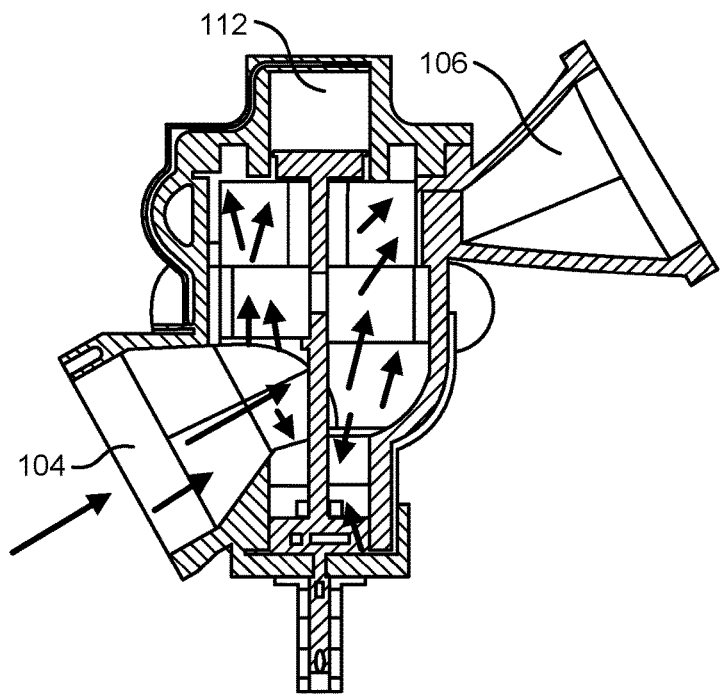
FIG. 5a is a schematic view of the new and improved solenoid-controlled, liquid cryogenic-hydraulically actuated valve assembly as illustrated within FIG. 1 showing the prevention of the flow-through of the cryogenic fluid from the inlet flange to the outlet flange of the valve assembly.
Figure 5B:
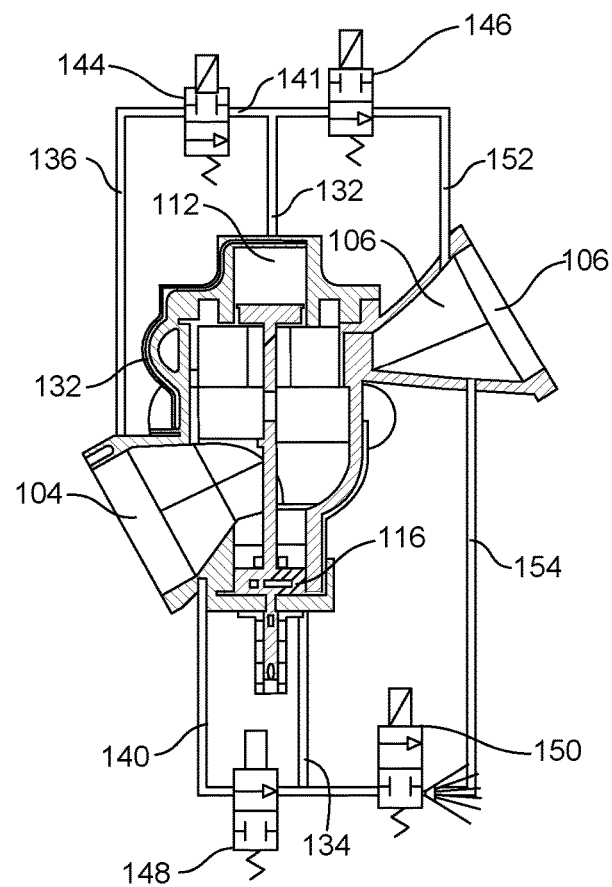

With reference now being made to FIGS. 5a, 5b, when it is desired to close the cryogenic valve assembly 100 such that the flow of cryogenic fluid therethrough is not permitted through the valve assembly 100, the first two-position solenoid-controlled normally open valve 144 is actuated to its second position such that cryogenic fluid is prevented from flowing from the first cryogenic fluid diversion conduit 136, through valve 144, and into the first fluid control or actuator conduit 141, while at the same time, the second two-position solenoid-controlled normally closed valve 146 is actuated to its second position so as to allow the flow of the cryogenic fluid to pass from the upper surface portion 138 of the CLOSED piston 112, through the first fluid control or actuator conduit 132, through the valve 146, and into the first vent conduit 152, all as illustrated within FIG. 5b. Line pressure will move through the first fluid inlet flange or conduit 104, further on through the interior portion 105 of the valve housing 102, and inside the annular wall member 118 and its plurality of struts 122, whereby such line pressure will be acting upon the lower or undersurface portion 139 of the first CLOSED piston 112, thereby providing an upward force that is unaffected by, and will effectively complement, the vented cavity above the upper surface portion 138 of the first CLOSED piston 112. Concomitantly with the aforenoted actuation of the first and second solenoid-controlled valves 144,146, the third and fourth solenoid-controlled valves 148,150 are actuated such that the third solenoid-controlled normally open valve 148 is disposed at a position that effectively allows fluid flow through the second cryogenic fluid diversion conduit 140 and into the second fluid control or actuator conduit 134, however the second solenoid-controlled normally closed valve 150 is disposed at a position at which fluid flow is not permitted to occur from beneath the undersurface portion 142 of the OPEN piston 116 and into the second vent conduit 154 and the second outlet flange or conduit 106. Therefore, since a first end of the second fluid control or actuator conduit 134 is fluidically connected to the first fluid inlet conduit or flange 104 by means of the second cryogenic fluid diversion conduit 140, while a second opposite end of the second fluid control or actuator conduit 134 is fluidically connected to the interior of the second piston cylinder 130 and to the lower or undersurface portion 142 of the second OPEN piston 116, line fluid can act upon the lower or undersurface portion 142 of the second OPEN piston 116. Due to the adjacent location and fluidic connection of the first fluid inlet conduit or flange 104 and the interior of the second piston cylinder 130, line pressure will be acting upon the upper surface portion 145 of the second OPEN piston 116 thereby producing a force-balanced condition for the second OPEN piston 116.

Figure 6A:
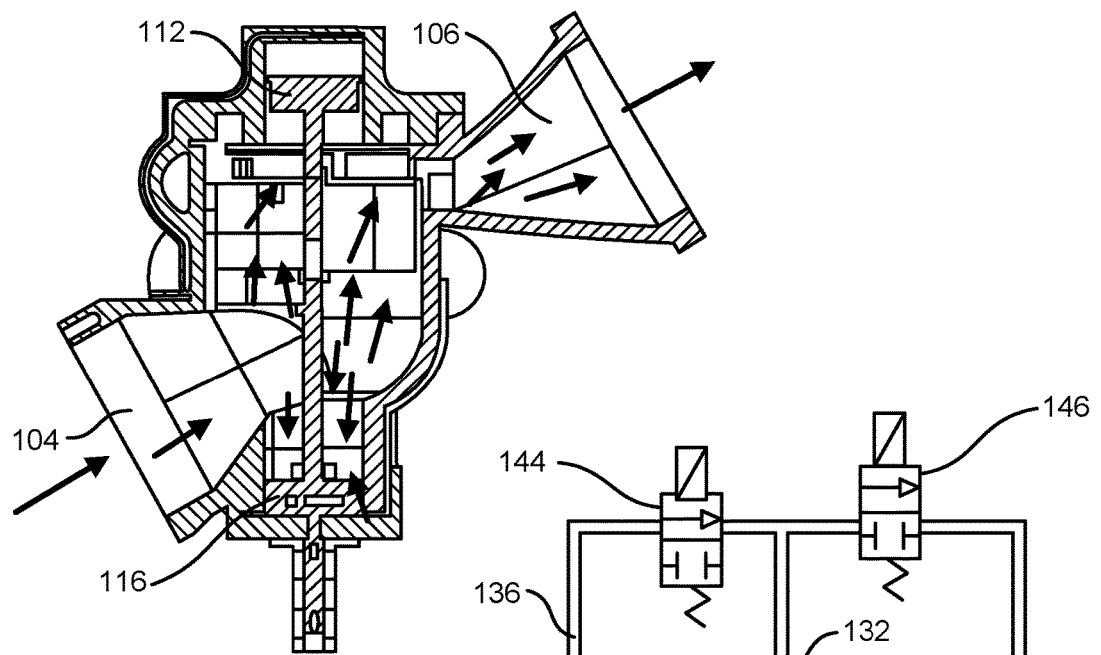
FIG. 6a is a schematic view of the new and improved solenoid-controlled, liquid cryogenic-hydraulically actuated valve assembly as illustrated within FIG. 1, simply showing the state of the various valve assembly components when electrical power is not longer supplied to the solenoid-control valves at which time the solenoid-control valves move to default positions at which cryogenic fluid is supplied to both the OPEN and CLOSED pistons whereby the piston assembly is disposed in a force-balanced, bi-stable disposition.
Figure 6B:
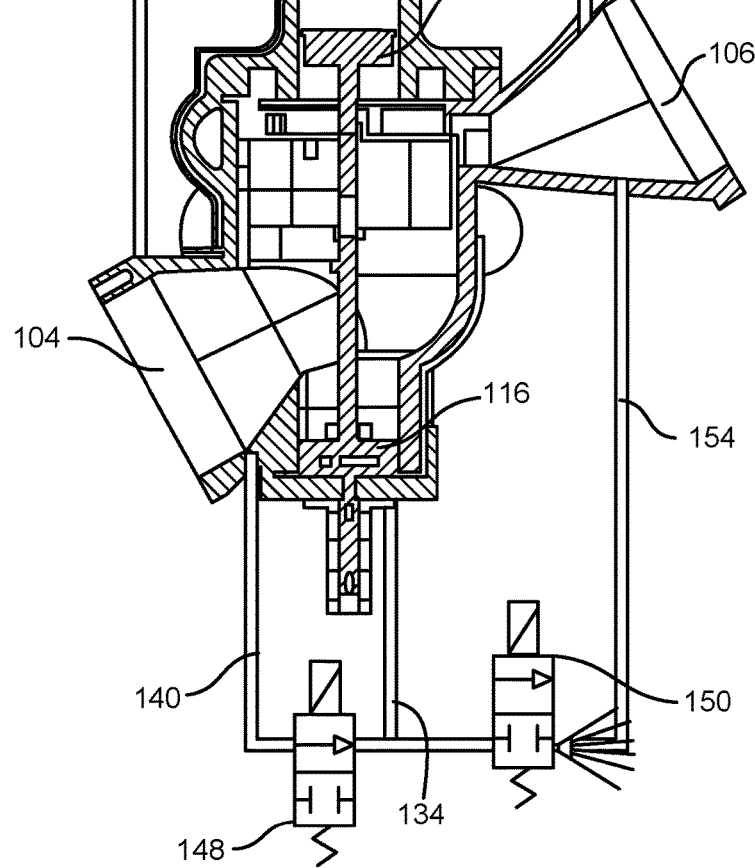

With reference lastly being made to FIGS. 6a, 6b, the cryogenic valve assembly 100 of the present invention is illustrated as being disposed in a hybrid or balanced state within which it is seen that the piston assembly, comprising the piston rod 108 and the OPEN and CLOSED pistons 116,112, is effectively disposed at an intermediate position between fully OPEN and fully CLOSED positions as illustrated within FIGS. 4a, 4b and 5a, 5b. More particularly, it is seen that the first and second solenoid-controlled valves 144,146 are disposed at their first positions as was illustrated within FIG. 4b, while the third and fourth solenoid-controlled valves 148,150 are likewise disposed at their first positions as was illustrated within FIG. 5b. Accordingly, the piston assembly, comprising the piston rod 108 and the OPEN and CLOSED pistons 116,112, is disposed at a partially OPEN, balanced, and stabilized position wherein cryogenic fluid hydraulically acts upon both OPEN and CLOSED pistons 116,112 as a result of cryogenic fluid being hydraulically conducted toward both OPEN and CLOSED pistons 116,112 by means of first and second cryogenic fluid diversion conduits 132,134.

Obviously, many variations and modifications of the present invention are possible in light of the above teachings. For example, while four, two-position solenoid valves have been disclosed as being utilized within the aforenoted inventive system, the number of valves may vary, and in addition, hand-operated, pneumatic, or other types of control valves may also be employed. It is therefore to be understood that within the scope of the appended claims, the present invention may be practiced otherwise than as specifically described herein.

NUMBER KEY GUIDE

100—Solenoid-controlled, liquid cryogenic-hydraulically actuated valve assembly
102—Valve housing
104—First fluid inlet flange or conduit
105—Central interior portion of the valve housing
106—Second outlet flange or conduit
108—Piston rod assembly
110—Longitudinal axis of piston assembly
112—First CLOSED piston
114—Piston rod of piston rod assembly
116—Second OPEN piston
118—Annular wall member of piston rod assembly
120—Vertically oriented wall portion of the valve housing 102
122—Plurality of struts connecting piston rod 108 to annular wall 118
124—Upper end cap of piston-cylinder assembly
126—Piston cylinder defined within end cap 124
128—Cylinder base
130—Second cylinder for piston 116
132—First fluid control or actuator conduit
134—Second fluid control or actuator conduit
136—First cryogenic fluid diversion conduit
138—Upper surface portion of piston 112
139—Undersurface portion of piston 112
140—Second cryogenic fluid diversion conduit
141—First cryogenic fluid interconnecting conduit
142—Undersurface portion of piston 116
143—Second cryogenic fluid interconnecting conduit
144—First cryogenic fluid solenoid-controlled valve
145—Upper surface portion of piston 116
146—Second cryogenic fluid solenoid-controlled valve
148—Third cryogenic fluid solenoid-controlled valve
150—Fourth cryogenic fluid solenoid-controlled valve
152—First cryogenic fluid vent conduit
154—Second cryogenic fluid vent conduit
156—Windows in vertically oriented wall portion of the valve housing 102

What is claimed as new and desired to be protected by Letters Patent of the United States of America, is:

1. A liquid cryogenic valve assembly for controlling the flow of a cryogenic fluid therethrough, comprising:
a valve housing including a first cylinder, a second cylinder, and a third cylinder axially aligned with one another;
a fluid inlet fluidically connected to said valve housing and adapted to introduce cryogenic fluid into said valve housing;
a fluid outlet fluidically connected to said valve housing and adapted to conduct cryogenic fluid out from said valve housing;
a piston valve assembly reciprocally movable within said valve housing between first and second positions, said piston valve assembly including a rod, a first control piston coupled to one axial end of said rod, a second control piston coupled to an opposing axial end of said rod, and a flow conducting member coupled to said rod between said first control piston and said second control piston, said flow conducting member having an annular wall and a plurality of struts coupling said annular wall to said rod to define a flow path through said flow conducting member;

said first control piston slidingly disposed within said first cylinder, said flow conducting member slidingly disposed within said second cylinder, and said second control piston slidingly disposed within said third cylinder, wherein, in said first position and in positions between said first position and said second position, said annular wall is positioned in said second cylinder with said flow path providing a fluid connection between said fluid inlet and said fluid outlet, and wherein, in said second position, said annular wall is positioned in said second cylinder to prevent said flow path from providing said fluid connection;

a first fluid diversion flow path for fluidically coupling said fluid inlet, said first cylinder, and said fluid outlet, said first fluid diversion flow path including a first conduit integrated within said valve housing and first valves in fluid communication with said first conduit; and a second fluid diversion flow path for fluidically coupling said fluid inlet, said third cylinder, and said fluid outlet, said second fluid diversion flow path including a second conduit integrated within said valve housing and second valves in fluid communication with said second conduit, wherein a position of said piston valve assembly at one of said first position, said second position, and one of said positions between said first position and said second position, is controlled by said first valves and said second valves.

2. A liquid cryogenic valve assembly as in claim 1, wherein said first valves comprise:
   a first solenoid-controlled valve disposed between said fluid inlet and said first cylinder; and
   a second solenoid-controlled valve disposed between said first cylinder and said fluid outlet.

3. A liquid cryogenic valve assembly as in claim 1, wherein said second valves comprise:
   a first solenoid-controlled valve disposed between said fluid inlet and said third cylinder; and
   a second solenoid-controlled valve disposed between said third cylinder and said fluid outlet.

4. A liquid cryogenic valve assembly as in claim 1,
   wherein said first valves comprise a first solenoid-controlled valve disposed between said fluid inlet and said first cylinder, and a second solenoid-controlled valve disposed between said first cylinder and said fluid outlet, and
   wherein said second valves comprise a third solenoid-controlled valve disposed between said fluid inlet and said third cylinder, and a fourth solenoid-controlled valve disposed between said third cylinder and said fluid outlet.

* * * * *